UNITED STATES PATENT OFFICE.

CHARLES R. CAVE, OF CHICAGO, ILLINOIS.

FLOOR-SWEEPING COMPOUND.

No. 891,525.  Specification of Letters Patent.  Patented June 23, 1908.

Application filed June 6, 1907. Serial No. 377,562.

*To all whom it may concern:*

Be it known that I, CHARLES R. CAVE, a citizen of the United States, residing at the city of Chicago, in the county of Cook and State of Illinois, have invented a new and useful Improvement in Floor-Sweeping Compounds, of which the following is a specification.

My invention relates to materials for laying and carrying dust in the process of sweeping and the like; and the object thereof is to produce a floor cleaning compound which shall be of the highest efficiency in preventing the raising of dust and in collecting and removing the same, which will not stain or soil the floor or fabrics to which it is applied, and which will be inexpensive to prepare and simple in the ingredients used.

The efficiency of materials of the class named has usually depended either upon their ability to hold or absorb moisture which, in turn, collects the dust, as such materials are placed in contact therewith; or upon the power to absorb and hold oily substances which perform a similar function to the moisture referred to. In some of such products both principles have been employed. The amount of moisture or watery substance which may be used, especially when it depends upon a hygroscopic substance forming a portion of the material, varies greatly in amount, causing the material to be uncertain in its action. On the other hand if the action of the compound depends upon an oily material, it is very difficult to so proportion the same that complete efficiency will be given without producing an excess of such oily substance, whereby the material to be cleansed will be soiled or become greasy in the application.

While I use a certain amount of oil in the compound which is the subject matter of my invention, the same is used in so much less a quantity than that which represents an allowable maximum, that there is no possibility of its being imparted to a floor or carpet. But to supply this deficiency I add an amount of viscous or adherent material of greater body or less fluidity, sufficient to completely gather the dust, but which, while acting in connection with the oil, will not soil the material, although added in full amount or used in excess.

In putting into effect the principles of my invention, I prefer to use saw dust, which has been properly dried, as the fundamental absorbent material, taking about thirty pounds thereof by weight for a total mixture of one hundred and fifty pounds. I prepare the mixture to be presented to the absorbent by mixing a fixed oil, like paraffin oil preferably having a specific gravity of between 25 and 26 degrees of the Baumé scale—with the substance known as vaseline or petrolatum. The proportions of these ingredients may vary according to the use to be made of the product. They may be mixed in the proportions of ten pounds of the oil and ten pounds of vaseline, which will make a product which will act without staining unless left for a considerable time, while the proportion of two pounds of the thinning oil and fifteen pounds of vaseline will produce a product which will not stain though the contact is indefinitely continued. The vaseline is stirred into the oil and thoroughly incorporated, using heat if necessary. The mixture is then put into the saw dust and thoroughly mingled therewith by any suitable means. As supplemental to the action of the saw dust in gathering dust upon it, I use for the amount of mixture named about eighty pounds of granulated slag, that is slag which has been turned while still molten into water, and thereby caused to take a more or less granular form. After this has been thoroughly dried and reduced by crushing as far as necessary to a uniform granular structure, it is incorporated with the saw dust and by thorough mixing is caused to take up a portion of the oil and petrolatum so that the surface thereof is covered with a very thin layer, the same penetrating furthermore into the pores of such granulated slag. To give additional weight and body, a small proportion, say twenty pounds of sand, may be added, the sand also acting as a slight abrasive in connection with the particles of slag.

In some cases it is desirable to provide for deodorizing and disinfecting surfaces to be treated, as well as abstraction of dust therefrom, and to this end a suitable disinfectant as oil of mirbane, otherwise known as nitrobenzol, oil of eucalyptus or oil of wintergreen may be added. The substances named in addition to their disinfecting and purifying properties add an agreeable perfume which will be imparted to the room after using.

I claim—

1. In a sweeping compound; the combination with an absorbent of a fixed oil, and petrolatum or vaseline.

2. In a sweeping compound; the combination with an absorbent of granulated slag, a fixed oil, and a viscous substance of greater body than said oil.

3. In a floor sweeping compound, the combination with an absorbent of granulated slag, a fixed oil, and a viscous substance of greater body than said oil.

4. In a floor sweeping compound; the combination of saw dust, granulated slag, a fixed oil, and petrolatum or vaseline.

5. The process of preparing a sweeping compound which consists in first dissolving petrolatum in a fixed oil, and then taking up the compound so produced by an absorbent.

6. In a floor sweeping compound; a composition composed of ingredients combined in substantially the following proportions,—30 pounds of sawdust, 17 to 20 pounds of paraffin oil of the character described, and petrolatum in varying proportions, and 80 pounds of granulated slag.

7. In a floor sweeping compound; a composition composed of ingredients combined in substantially the following proportions,—30 pounds of sawdust, 10 pounds of paraffin oil of the character described, 10 pounds of petrolatum, and 80 pounds of granulated slag.

8. In a floor sweeping compound; a composition composed of ingredients combined in substantially the following proportions,—30 pounds of sawdust, 17 to 20 pounds of paraffin oil of the character described, petrolatum in varying proportions, 80 pounds of granulated slag, and 20 pounds of sand.

9. The method of preparing a sweeping compound, which consists in dissolving petrolatum in a fixed oil, taking up the compound so produced by an absorbent, and incorporating granulated slag therewith.

10. The method of preparing a sweeping compound, which consists in dissolving petrolatum in a paraffin oil having the characteristics described, taking up the compound so produced by an absorbent, and then incorporating granulated slag therewith.

11. The method of preparing a sweeping compound, which consists in dissolving petrolatum in paraffin oil of the character described to make from 17 to 20 pounds of the mixture, taking up the compound by 30 pounds of sawdust, and then incorporating therewith 80 pounds of granulated slag and 20 pounds of sand.

In witness whereof, I have hereunto set my hand, this 4th day of June A. D. 1907, in the presence of two subscribing witnesses.

CHARLES R. CAVE.

Witnesses:
C. K. CHAMBERLAIN,
A. S. PHILLIPS.